Dec. 27, 1938. J. C. MILLER 2,141,925
LIQUID METERING AND DISPENSING APPARATUS
Filed Nov. 16, 1935   2 Sheets-Sheet 1
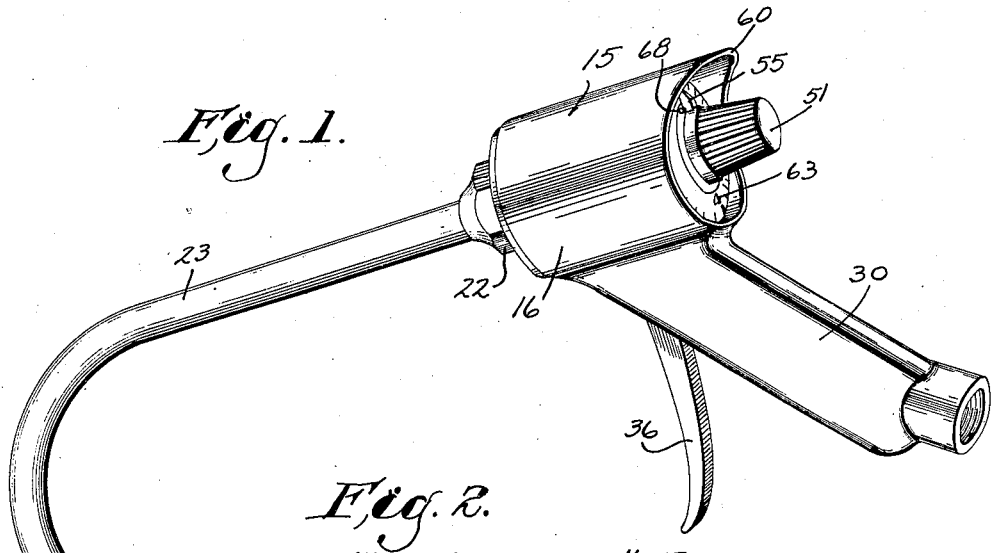
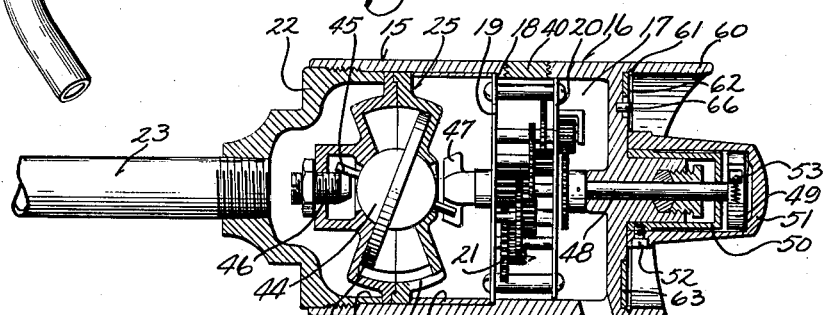
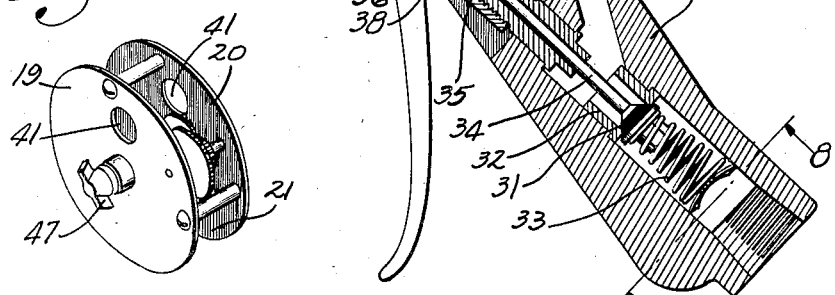
INVENTOR
Jacob C. Miller
BY Wheeler, Wheeler and Wheeler
ATTORNEYS Dec. 27, 1938. J. C. MILLER 2,141,925
LIQUID METERING AND DISPENSING APPARATUS
Filed Nov. 16, 1935 2 Sheets-Sheet 2
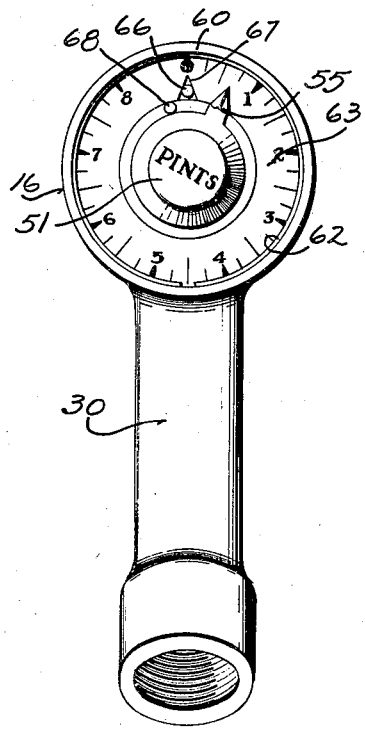
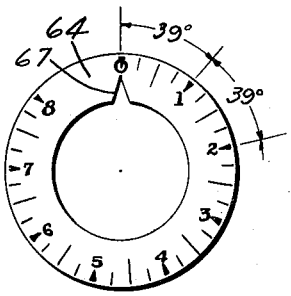
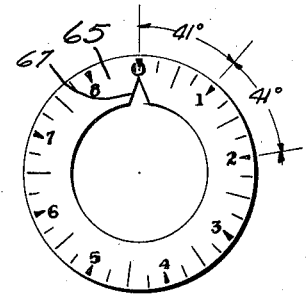
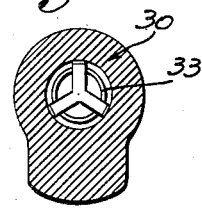
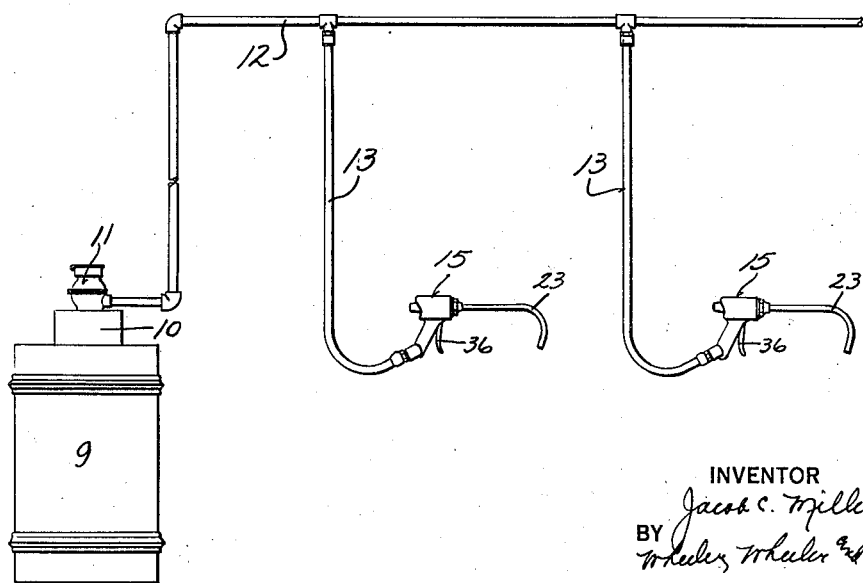
INVENTOR
Jacob C. Miller
BY Wheeler, Wheeler & Wheeler
ATTORNEYS Patented Dec. 27, 1938

2,141,925

UNITED STATES PATENT OFFICE 2,141,925

LIQUID METERING AND DISPENSING APPARATUS

Jacob C. Miller, Milwaukee, Wis., assignor to Badger Meter Manufacturing Company, Milwaukee, Wis., a corporation of Wisconsin Application November 16, 1935, Serial No. 50,143

10 Claims. (Cl. 73—198)

This invention relates to improvements in lubricant metering and dispensing.

It is the primary object of the invention to provide a small, light, portable meter incorporated in a dispensing nozzle so that any number of dispensing nozzles may be operated from a single supply source without confusion and without requiring the operator to go to the totalizing meter at the source to ascertain the amount of lubricant dispensed.

It is a further object of the invention to provide a novel and improved organization of dispensing nozzle, meter and control valve, wherein the liquid admitted to the nozzle by the valve is required to pass through the entire gear train chamber and meter chamber for the purpose not only of lubricating the parts but also insuring the movement of grease through all portions of the device without allowing any grease to remain stagnant and to harden in areas remote from the path of lubricant flow.

It is a further object of the invention to provide a light portable meter with a pistol grip handle by means of which the meter and its associated delivery spout may be manipulated with the same freedom as if only a delivery spout were involved, the meter having a dial and indicating pointer disposed immediately above the handle at the end of the meter barrel in a position to be read conveniently in all positions of use of the device to which it may be manipulated by said handle.

In the drawings:

Figure 1 is a view in perspective of a metering nozzle and valve preferably employed in a lubricant dispensing system embodying the present invention.

Figure 2 is an enlarged detail view in axial section of the portion of the dispenser which contains the meter and valve mechanism.

Figure 3 is a diagrammatic side elevation of the component parts of a dispensing system employing the nozzles shown in Figures 1 and 2.

Figure 4 is a detail view in perspective of the gear train frame as it appears when removed from the assembly shown in Figure 2.

Figure 5 is a rear elevation of the device shown in Figure 1 and Figure 2.

Figure 6 and Figure 7 are views in rear elevation of modified interchangeable dials.

Figure 8 is a detail view taken in section on the line 8—8 of Figure 2.

Like parts are designated by the same reference characters throughout the several views.

As shown in Figure 3, my improved device contemplates a single source of supply such as the barrel 9 from which a single dispensing pump 10 may discharge grease through a totalizing meter at 11 and a pipe line 12 to a number of flexible hoses 13, each of which is supplied at its end with the dispensing metering valve and nozzle generically designated by reference character 15. Since the operator of each of the nozzles 15 has immediately available to him a meter showing the amount of material dispensed through that nozzle, he is able to keep track of the lubricant dispensed in the servicing of a particular car without having a separate source of supply and without going to the source of supply to read the meter and without the possibility of confusion as between the amount of grease dispensed by him and the amount dispensed from the same source through some other nozzle.

In order to make a nozzle for the purposes specified, it was necessary to devise a particularly compact organization. The casing 16 is formed to provide a chamber 17 shouldered at 18 for engagement by the larger of the two disks 19 and 20 comprising a frame for the conventional gear train 21.

The otherwise open end of casing 16 is closed by the cap 22 which carries a relatively long curved pipe or spout 23 from which the lubricant issues. The skirt portion 24 of the closure 22 engages the flanges of a conventional metering chamber 25 forcing the chamber tightly against sleeve 26 which receives the thrust of the closure member and transmits it to the frame of the gear train to anchor said frame in place against shoulder 18.

Casing 16 is integrally provided with a handle 30 through which the lubricant is admitted subject to the control of the valve 31. The valve is held to its seat against collar 32 by means of a helical spring 33 having closely wound coils which serve the function of a strainer to prevent any foreign matter of substantial size from reaching the valve or the meter. The valve stem 34 passes outwardly through the usual packing gland 35 to a position for engagement by the valve operating trigger 36 which is pivoted at 37 for oscillation in the slotted portion 38 of the pistol grip handle 30.

Leading from the valve seat collar 32 at an angle to the valve stem 34, is the lubricant passage 39 which admits the lubricant preferably at the extreme end of chamber 17. This passage may be bored through a hole in the casing which is later closed by plug 40. When the lubricant is admitted at the end of the casing, it is necessary for the lubricant to pass through the gear train frame, apertures preferably being provided at 41 for the purpose. These apertures are preferably located remote from the inlet 42 through which the lubricant is admitted to the interior of the meter chamber 25 to act on the wabble disk 43 therein.

The wabble disk 43 preferably has the usual spherical bearing 44 and a guide pin 45 which has an orbital movement around an adjusting screw 46.

At its opposite end the pin 45 engages the driving member 47 of the gear train and motion is transmitted through the gear train to a spindle 48 mounted in a suitably packed bearing in the end of casing 16. The end of the spindle carries an overrunning clutch mechanism 49 which is fastened thereto and enclosed between the inner and outer parts 50 and 51 of a resetting knob and pointer. The outer part 51 of the knob is held by a set screw 52 to the inner part thereof. The overrunning clutch mechanism 49, firmly fixed on the end of spindle 48 engages the inner and outer ends of the knob parts to limit knob movement in either axial direction. The clutch roller 53 drives the outer knob part 51 normally in a clockwise direction, but permits the knob to be turned freely in a counterclockwise direction to reset the pointer 55 to its zero position.

The overrunning clutch mechanism 49, 53 and its association with the knob parts 50 and 51 is not claimed herein, being disclosed in a companion application.

Integral with the casing 16 is a projecting hood 60 surrounding the knob 51, and the path of pointer 55. An undercut groove at 61 therein receives a spring retaining ring 62 which holds any one of the dials 63, 64, or 65 against the end wall of the casing. A pin 66 projecting from the casing end wall is received into a notch 67 in each of the dials to maintain them in proper registration. Another pin at 68 within the space occupied by the annular dials serves as a stop to define the zero position of pointer 55.

When the pointer is in its zero position it covers the pin 66 and registers with the notch 67 so that upon removal of the spring retaining ring 62, it is easily possible to take out the dial for substitution by another. In the particular device shown, the dial is calibrated in pints, but it may also be calibrated in liters. Whatever its unit of measurement, I preferably provide two or more interchangeable dials such as those shown in Figure 6 and Figure 7 in which there is a slightly varying angular distance between the unit points. Thus the standard dial shown in Figure 5 has a forty degree separation between units while the dial 64 in Figure 6 has a thirty-nine degree separation, and that shown in Figure 7 has a forty-one degree separation. Since the meter only registers up to a total of eight pints and since this total is reached before the pointer has made a complete revolution, the slight difference in the location of the total mark is immaterial to the successful use of the meter and the differently spaced unit marks on the interchangeable dials may be used to correct any error in the calibration of the meter. This eliminates the conventional use of "change gears" in the gear train and makes it unnecessary to open up the device for calibrating purposes.

I claim:

1. A dispensing nozzle comprising the combination with a barrel portion and a pistol grip handle projecting therefrom, said handle having an inlet passage and a divergent supply passage leading therefrom to one end of the barrel, means providing a valve seat in the inlet passage, a valve engageable with said seat having a stem extending longitudinally of said passage, an exposed trigger provided with means operable upon said stem for the opening of said valve, a meter having a meter gear train in said barrel, and a discharge spout opening from said barrel.

2. A dispensing system comprising the combination with a barrel having one end closed and the other provided with a curved delivery pipe, of a pistol grip handle applied to one side of the barrel and having an internal passage leading to the barrel adjacent the closed end thereof, valve means in the handle controlling the passage, and a meter mounted in the barrel and comprising a motor and a register train in the path of material flowing through said barrel from said passage to said pipe, a driven shaft operatively connected with the gear train extending through the closed end of the barrel, and indicating means carried by said shaft and rotatable across said closed barrel end.

3. In a dispensing system, the combination with a barrel having a discharge spout at one end and a head closing its other end, of an indicator shaft projecting through said head parallel to the axis of the barrel, indicating means thereon, dial means at the closed end of the barrel with which said indicating means cooperates, meter mechanism within the barrel operatively connected to said shaft, and a handle projecting laterally from the barrel and provided with a grip portion through which a passage extends, said passage communicating with the barrel between said metering mechanism and the closed end of the barrel, a port surrounding the passage within the handle, a valve within the handle controlling the port, and a valve lever operatively connected with said valve for the actuation thereof and provided with a pivotal mounting upon which said lever is movable to and from the handle.

4. A dispensing system including a nozzle having in combination a chambered barrel provided with a discharge spout at one end and a head closing its other end, a handle connected therewith and projecting laterally from the barrel and provided with a grip portion and an interior supply passage communicating with the barrel, a valve disposed within said handle and provided with a seat and operable to control the flow through said passage to said barrel, a hose connection at the end of said handle remote from said barrel for supplying material through said handle to said barrel under the control of said valve, a meter mounted in the barrel and including a chamber in the path of flow from said handle passage to said spout and including a driven indicator shaft projecting substantially axially through said barrel head, indicating means carried by said shaft externally of said barrel, dial means mounted on said barrel head in operative relation to said indicator means, and a valve lever positioned in the angle between the side of the barrel and the handle and operatively connected with the valve, said lever being disposed for operation by the same hand of the operator which is engaged with the handle.

5. A dispensing system comprising the combination with a barrel having a discharge spout at one end and a dial at the other, of metering mechanism within the barrel having a pointer shaft projecting through said dial and a pointer externally of the barrel for acting with the dial, a handle projecting laterally from the side of the barrel and providing a pistol grip and an intake passage communicating with the barrel, said handle having a hose coupling at its end for supplying material to said passage, a port within the handle, a valve wholly disposed within the handle and seating at said port to control flow through said passage from the hose connection to the barrel, and a lever operatively connected with said valve for the actuation thereof and positioned to be operated by the same hand of the operator which is engaged with the grip portion of said handle.

6. A dispensing system comprising the combination with a barrel having a discharge spout at one end, an indicator at the other and a meter housed within the barrel and operatively connected with the indicator, of a handle projecting laterally from the side of the barrel and provided with an internal supply passage communicating with the barrel and having a port, a valve wholly disposed within the handle and movable to and from the port for controlling supply therethrough, a spring for seating the valve, a valve stem guided within the handle for unseating the valve, and a lever operatively connected with said stem and provided with a pivotal mounting upon which said lever is movable to and from said handle, said lever being disposed in an angle between the handle and the barrel.

7. In a device of the character described, a dispensing nozzle comprising a chambered barrel having a lateral admission connection comprising a pistol grip handle, a discharge spout opening from said barrel at a point spaced from said handle, said barrel and spout being unitarily adapted for manipulation as a spout by said handle, a meter device in said barrel having a driven shaft projecting substantially longitudinally from said barrel through the end thereof opposite said spout and adjacent said handle, and indicating means carried by the shaft and the end of the barrel respectively to show the extent of shaft rotation and the amount of material passing said meter device, said indicating means being located above said handle for direct reading by a person manipulating said handle.

8. A device of the character described comprising the combination with a barrel having a discharge spout at one end and a dial at the other, of a pistol grip handle extending laterally from the side of the barrel and inclined toward said last mentioned end thereof and containing an inlet passage, a meter in said barrel including a fluid motor disposed between said passage and spout, and a motor operated shaft projecting substantially axially from said barrel and provided with a pointer movable about the dial at the end of the barrel and immediately over said handle, said handle being provided with a valve and a valve operating lever positioned to be included in the operator's grip in manipulation of said handle.

9. In a device of the character described, the combination with a barrel having a closed end and a discharge end and provided with a lateral inlet connection adjacent its closed end comprising a handle for the manipulation of the barrel, of a meter device in said barrel between said inlet connection and said discharge end and provided with a driven shaft projecting through the closed barrel end immediately above said handle, a pointer carried by said shaft, a dial on said closed barrel end over which said pointer operates in full view of a person manipulating said handle, and means releasably fixing said dial in a predetermined position of registration with respect to said barrel.

10. In a device of the character described, the combination with a barrel having a closed end and a discharge end and provided with a lateral inlet connection adjacent its closed end comprising a handle for the manipulation of the barrel, of a meter device in said barrel between said inlet connection and said discharge end and provided with a driven shaft projecting through the closed barrel end immediately above said handle, a pointer carried by said shaft, a dial on said closed barrel end over which said pointer operates in full view of a person manipulating said handle, and means releasably fixing said dial in a predetermined position of registration with respect to said barrel, said means comprising a projection from the closed barrel end at a point spaced radially from the shaft within the path traversed by said pointer, and said dial comprising an annulus provided on its inner periphery with a notched margin fitting said projection and receivable over said pointer.

JACOB C. MILLER.